(12) United States Patent
Cailleux

(10) Patent No.: US 6,949,841 B1
(45) Date of Patent: Sep. 27, 2005

(54) SYSTEM FOR MANAGING ELECTRIC POWER IN A HYBRID MOTOR VEHICLE

(75) Inventor: Helene Cailleux, Le Chesnay (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 146 days.

(21) Appl. No.: 10/181,440

(22) PCT Filed: Aug. 29, 2000

(86) PCT No.: PCT/FR00/02395

§ 371 (c)(1),
(2), (4) Date: Sep. 3, 2003

(87) PCT Pub. No.: WO01/22556

PCT Pub. Date: Mar. 29, 2001

(30) Foreign Application Priority Data

Sep. 22, 1999 (FR) .................................. 99 11823

(51) Int. Cl.[7] ........................... B60K 1/00; B60K 6/00; H02P 9/04
(52) U.S. Cl. ................. 290/40 C; 290/40 R; 290/40 A; 290/40 B; 290/40 D
(58) Field of Search .................. 290/40 R, 40 A–40 D, 290/40 F

(56) References Cited

U.S. PATENT DOCUMENTS

| | | | | |
|---|---|---|---|---|
| 3,792,327 A | * | 2/1974 | Waldorf ...................... 318/139 |
| 5,081,365 A | * | 1/1992 | Field et al. ..................... 290/45 |
| 5,588,498 A | * | 12/1996 | Kitada ........................ 180/65.4 |
| 5,635,805 A | * | 6/1997 | Ibaraki et al. ............... 318/139 |
| 5,823,280 A | * | 10/1998 | Lateur et al. ............... 180/65.2 |
| 5,903,112 A | * | 5/1999 | Yamada et al. ................ 318/10 |
| 6,276,472 B1 | * | 8/2001 | Takashima et al. ......... 180/65.2 |
| 6,389,807 B1 | * | 5/2002 | Suzuki et al. ................. 60/285 |
| 6,390,214 B1 | * | 5/2002 | Takahashi et al. .......... 180/65.2 |
| 6,563,230 B2 | * | 5/2003 | Nada ......................... 290/40 C |
| 6,784,563 B2 | * | 8/2004 | Nada ......................... 290/40 C |

* cited by examiner

Primary Examiner—Nicholas Ponomarenko
Assistant Examiner—Pedro J. Cuevas
(74) Attorney, Agent, or Firm—Westerman, Hattori, Daniels & Adrian LLP

(57) ABSTRACT

For a parallel hybrid motor vehicle equipped with a power unit comprising an electric machine and a heat machine and provided with a power or high-voltage battery and a duty or low-voltage battery, a system for managing energy includes means for managing the power of the power unit capable of supplying data representing estimates of drive torque and of generating torque and Boolean data representing authorization to stop or start the heat machine; means for managing the duty battery for receiving data indicating temperature of the battery and for supplying to the power management means data indicating the battery charge set value; and means for managing the power battery for receiving data indicating temperature values, charging current and voltage values of the battery and for supplying data to the power management means of the power unit indicating the type of charging to be performed for the battery.

5 Claims, 2 Drawing Sheets

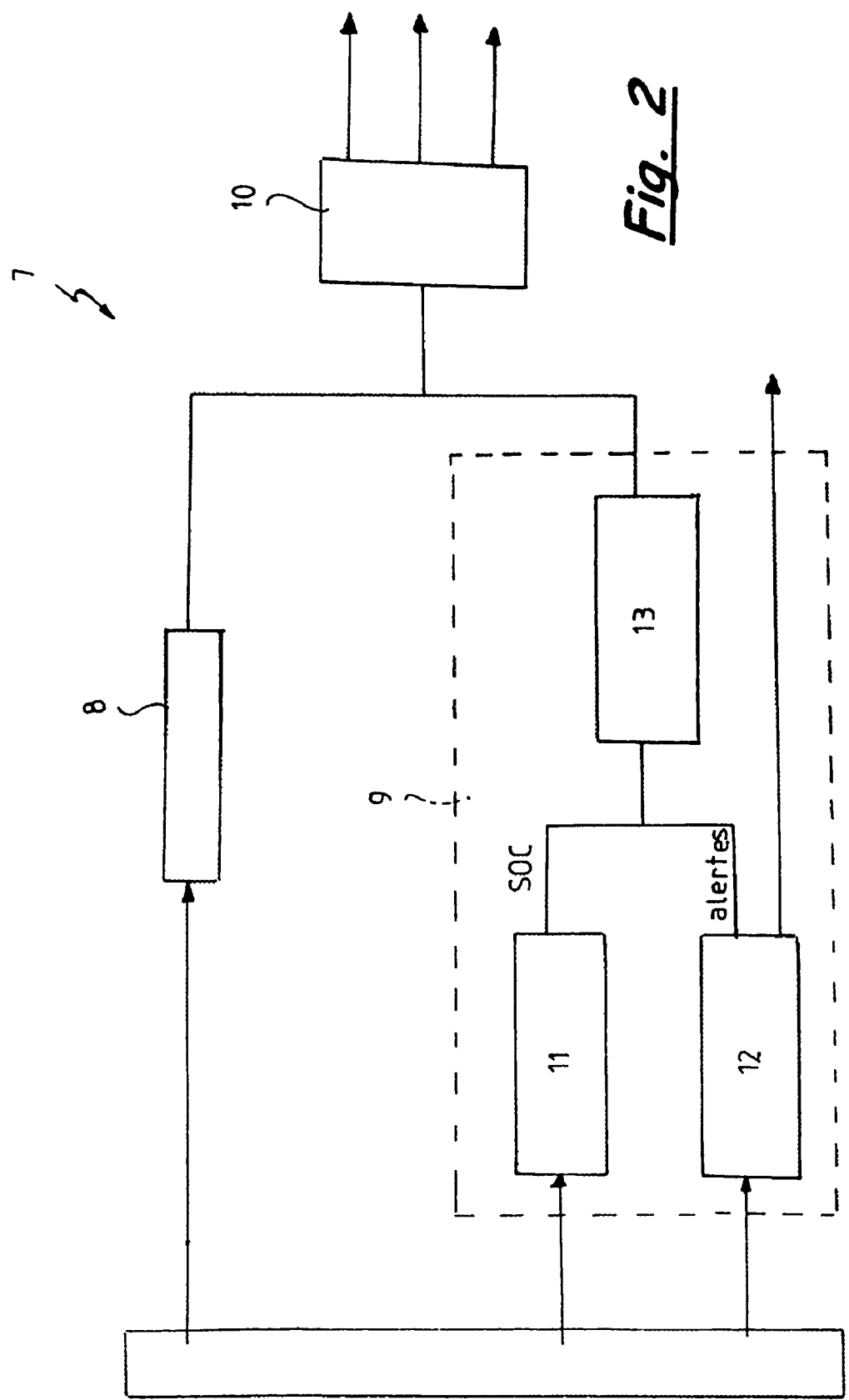

SYSTEM FOR MANAGING ELECTRIC POWER IN A HYBRID MOTOR VEHICLE

Figure 1:
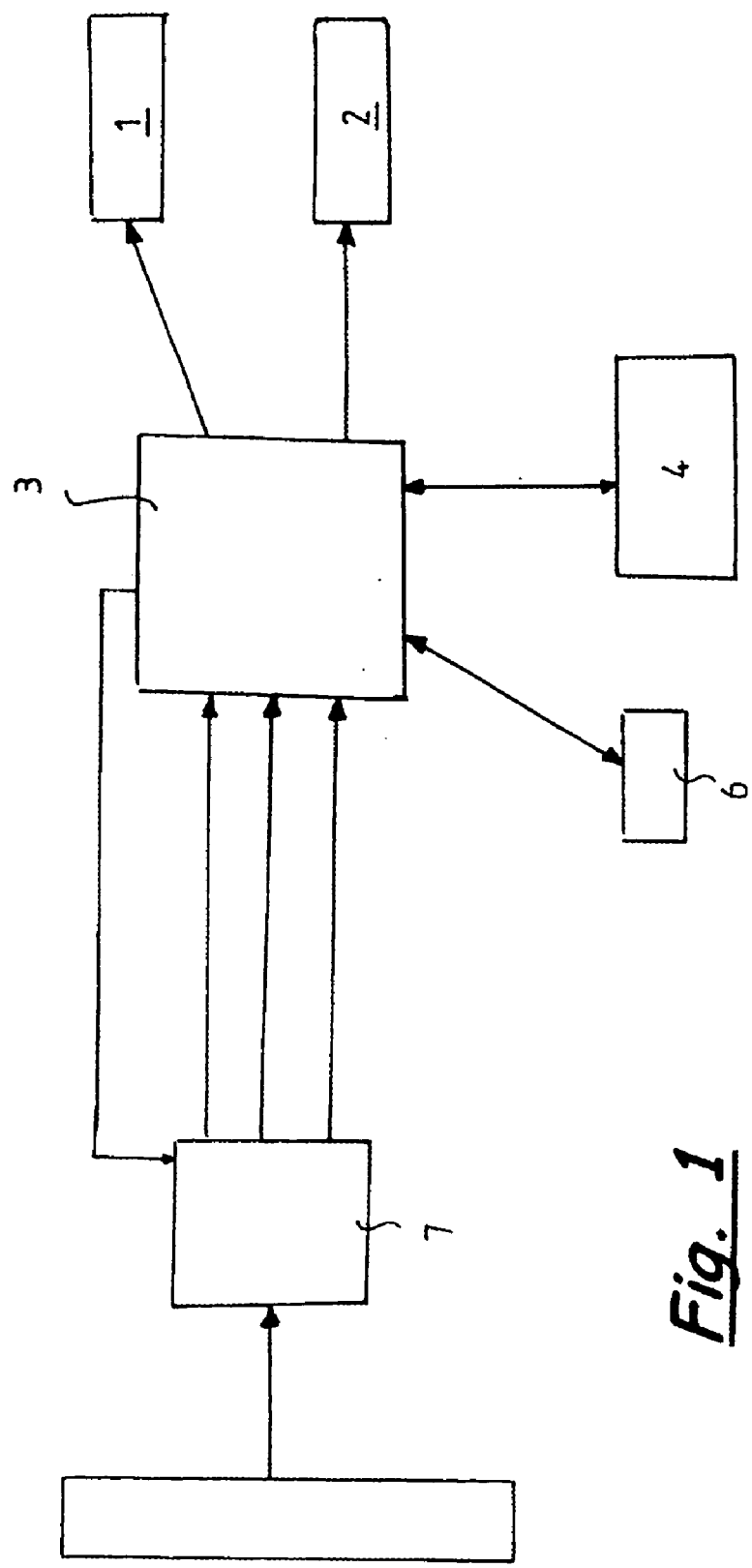

The present invention involves a system for managing electric power in a parallel hybrid motor vehicle equipped with a power unit comprising an electric machine and a heat machine and provided with a power battery and a duty battery.

It relates most particularly to a system for managing electric power of a power unit for a hybrid motor vehicle, referred to as a starter/alternator.

Several definitions are recalled in the following. Essentially, two groups of hybrid motor vehicles are known, so-called "series" hybrids and "parallel" hybrids.

The series hybrids are power units in which a heat engine such as a piston engine drives a generator that produces the electricity in order to supply one or more electric motors connected to the wheels of the vehicle. A storage battery makes it possible to store electric power in order to make the electric motor work.

The parallel hybrids are power units in which a heat engine, an electric machine supplied by a storage battery and a mechanical transmission are coupled by the intermediary of a device that makes it possible to connect one to the other in rotation. The electric machine is able to function equally as a motor or as a current generator. This type of motorization has the advantage of being able to use two types of propulsion, thermal and electric, alternatively or simultaneously. The passage from one operational configuration to another is ensured by control means that perform all the control and power management functions.

The starter/alternator is a particular parallel hybrid, which comprises an electric motor that is run electronically, inserted between the engine and the transmission replacing the starter motor, the alternator and the traditional motor flywheel. This type of hybrid contains, in addition, two batteries, a duty battery dedicated to supply power to a on-board network notably when in the rolling phase, and a power battery dedicated mainly to supplying energy for the electric machine.

It turns out that in this type of power unit, electric power is consumed in order to transform it into mechanical energy during the traction or the propulsion of the vehicle, but also electric power is created from the mechanical energy during generation, so that it is necessary to manage this energy generation.

A purpose of the invention is to manage the electric power found in a system of this type in order to guarantee a state of charge or level of energy sufficient for the duty batteries and the power batteries, but also a usage of the power battery in an optimized range in order to guarantee simultaneously battery performance (lifetime, power) and the performance required by the starter/alternator system.

To this effect, an object of the invention is a system for managing the electric power of a parallel hybrid vehicle equipped with a power unit comprising an electric machine and a heat machine and provided with a power or high-voltage battery and a duty or low-voltage battery, this vehicle comprising a monitoring device adapted to control the electric machine and the heat machine. According to the invention, the system comprises:

means for managing the energy of the power unit adapted to supply data indicating the estimation of the drive torque, the estimation of the generating torque, and Boolean data indicating the authorization to stop or to request a start-up of the heat machine;

means for managing the duty battery, adapted to receive, by input, data indicating the temperature of this battery and adapted to supply by output, to the means for managing the energy of the power unit, data indicating the set value for the charge voltage of this battery;

means for managing the power battery, adapted to receive by input data indicating the temperatures, the charging current and the voltages of this battery, and adapted to supply by output to the means for managing the energy of the power unit, data indicating the type of the charge of this battery to be produced.

Advantageously, the means for managing the power battery comprise means for determining the state of charge of the power battery, means for monitoring the power battery and means for deciding the type of the charge to be produced, adapted to receive by input data, possibly Boolean, coming from these means.

Preferably, the monitoring means are adapted to transmit a request for starting up a cooling fan according to the measured temperature of the power battery.

Advantageously, the decision-making means are adapted to receive, by input, the data, possibly Boolean, on the state of charge of the power battery coming from the means, and the data on the alerts sent by the monitoring means, thus determining, depending on the different activated alerts, the cut-off of the charge or discharge of the power battery.

Also advantageously, the means are adapted, as a function of the data, possibly Boolean, of the state of charge, to perform the following strategy:

If SOC<SOC_P then there is priority charge, corresponding to recharging the battery as a priority so that the state of charge leaves the forbidden zone without taking into account the output of the drive chain, If SOC_P≦SOC<SOC_N then there is normal charge, corresponding to recharging the battery if certain conditions are fulfilled, for example, heat engine not stopped, good output of the drive chain, If SOC≧SOC_N then there is no charge, SOC_P and SOC_N are variables that are determined as follows:

No request for charge while stopped then SOC_P=50% and SOC_N=95%

A request for charge while stopped then SOC_P=80% and SOC_N=80%

The characteristics of the invention mentioned above, as well as others, will appear more clearly in reading the following description of an example of embodiment, while referring to the attached drawings, in which:

FIG. 1 is a synoptic diagram illustrating an example of embodiment of a control system of a starter/alternator; and FIG. 2 is a synoptic diagram illustrating an example of embodiment of a system for managing energy according to the invention.

In FIG. 1, an electric machine 1 and a heat machine 2 can be seen which are connected respectively to a monitoring device 3 designed to control them by transmitting to them respectively a set value as a function of triggering data received from a computer of the heat engine 4, from a computer of the starter/alternator machine 6 and from a system for managing the electric power 7 according to the present invention designed to transmit mainly to the monitoring device 3 three types of data for the estimation of the drive torque, the estimation of the generation torque, and the authorization to stop or to request a starting-up of the heat engine, commonly referred to as "stop and go", respectively, as a function of data coming in large part from the duty batteries and the power batteries.

In the following, the computers of the starter/alternator 6 and the heat engine 4, which receive data coming notably from the driver's console, which are, for example, sent by sensors in order to determine the intentions of the driver, will not be described in greater detail since they are not part of the scope of the invention.

The system for managing electric power 7, according to the present invention, is comprised of three modules, as shown in FIG. 2, respectively, a module for managing a duty or low-voltage battery 8, a module for managing a power or high-voltage battery 9 and a module for managing the energy 10 of the starter/alternator system.

The structure and the operation of each of these modules of the management system according to the present invention will be described in sequence in the following.

The module for managing the duty battery 8 has a function of determining the set value for the voltage of this battery as a function of the temperature in order to recharge it and also to ensure that the voltage of the duty battery is correct during any recharge of the power battery, the duty battery being capable, in certain particular phases of the lifetime of the vehicle, of recharging it or supplying it with additional power.

In order to do this, the managing module 8 receives by input data on the temperature of the duty battery which is either transmitted by a sensor associated with the battery, or restored, in order to transmit to the module for managing the energy 10, a set value for the recharge voltage that can be accepted by the battery, as a function, for example, of a pre-established curve.

The managing module 9 of the power battery advantageously consists of a module 11 for determining the state of charge of the power battery, a module 12 for monitoring the battery and a charge strategy module 13 which receives by input data from the output of these two modules 11 and 12.

The module 11 for determining the state of charge counts the ampere-hours charged or discharged, possibly affected by an output, and to do this, this module receives, by input, data on temperature and current of the battery, which are sent by the sensors.

Advantageously, it is noted that before each time the computer is cut off, the last current state of charge is saved, and upon each start-up of the power unit, this last state of charge is corrected according to the time the vehicle was off, corresponding to a self-discharge parameter.

A re-initialization of the state of charge is made at 100% when one of the full charge criteria has been reached.

The monitoring module 12 makes it possible to control, as a function of data on voltage and temperature sent by the sensors, the temperatures, the total voltage and the partial voltages in order to provide information on the use of this power battery.

Any use of the power battery is authorized and continued only if the temperature is taken in an interval between a minimum temperature Tmin and a maximum temperature Tmax, preferably Tmin=−25° C. and Tmax=50° C.

When the temperature measured by the battery becomes too large or when the different measurements of the temperature are not homogenous among themselves, the monitoring module 12 transmits a request for starting up a cooling fan, thus ensuring a cooling of the battery.

In addition, the monitoring of the derivative of the temperature relative to time gives an indication of the end of the charge of the battery.

The monitoring of the total voltage makes it possible to authorize any discharge only if the voltage is greater than a certain value Umin, preferably Umin=31 V. In the same way, any charge is authorized if the voltage is less than a certain value Umax, preferably Umax=57V.

In addition, the discharge or charge phases are authorized only if, respectively, the partial voltages are greater than a certain value Upmin, preferably Upmin=10.5V and the partial voltages are less than a certain value Upmax, preferably Upmax=19V.

The monitoring module also watches over the homogeneity of the voltage of the battery. Thus, during operation of a battery, the state, and as a result, the voltage, of the elements can be different. This occurs when the elements are not all at the same temperature. Thus, if the dispersion DU of the elements is too large, the performance of the battery is no longer maintained (capacity, power) and some elements can be irreparably damaged if their voltage becomes too low. The dispersion DU is calculated from the partial voltages. A threshold of the maximum permissible dispersion is determined as a function of the amplitude of the instantaneous current in order to set off an alert of the monitoring module.

The strategy module 13 receives by input, as mentioned above, data on the state of charge of the power battery and alerts possibly sent by the monitoring module 12 which thus determines, according to the different activated alerts, the cut-off of the charge or the discharge of the battery.

In an advantageous manner, the tests have shown that the state of charge SOC must never be less than a minimum state of charge SOCmin, preferably this minimum state of charge has been determined to be 30% in order to eliminate any problems of duration of the life of the battery. In addition, in order to guarantee a sufficient duration of the life of the battery, it is necessary to limit the depths of the discharge to the maximum. An optimal functioning would be when the state of charge of the battery remains in the range 50%–80%.

The strategy module will specify the following strategy as a function of the data on the state of charge:

If SOC<SOC_P then there is priority charge, corresponding to recharging the battery as a priority so that the state of charge leaves the forbidden zone without taking into account the output of the drive chain, If SOC_P≦SOC<SOC_N then there is normal charge, corresponding to recharging the battery if certain conditions are fulfilled, for example, heat engine not stopped, good output of the drive chain, If SOC≧SOC_N then there is no charge, SOC_P and SOC_N are variables that are determined as follows:

No request for charge while stopped then SOC_P=50% and SOC_N=95%

A request for charge while stopped then SOC_P=80% and SOC_N=80%

The strategy module thus sends data on the type of charge to be planned which is transmitted to the module for managing the energy of the system.

A function of this module is to define the strategy for controlling the DC/DC direct current converter and calculating the requirements of the charge couple as a function of the possibilities of the electric system and the consumption criterion (charge efficiency).

In order to do this, this module involves the determination of the potential of the electric system and the electric control.

The determination of the potential consists in synthesizing the actions that can be performed by the electric system (electric drive torque, charge couple, stop and go) and the expectations of the electric system (request for assistance for cold start-up) as a function of the state of charge of the battery, its temperature, the couple that can be made by the electric machine, and the consumption of the on-board 12V network.

The control of the electric network consists in connecting or not connecting the DC/DC direct current converter of the starter/alternator system onto the high-voltage network as a function of the situations of the life of the system. This control also consists in, on the one hand, controlling the set value for the voltage of the DC/DC converter as a function of the situations of the life of the system (cold start-up, rolling, charge while stopped) and, on the other hand, determining the requests for coupling of the charge as a function of the charge strategy, and optimizing them.

Thus, it is apparent that the monitoring device 3 determines which action it is possible to perform in order to best meet the driver's request according to the available energy, thus optimizing the electric power of the system, as a function of the different parameters supplied by the management system according to the present invention.

Of course, different embodiments of this type of system can be envisioned.

What is claimed is:

1. System for managing electric power of a parallel hybrid vehicle equipped with a power unit comprising an electric machine and a heat machine and provided with a power or high-voltage battery and a duty or low-voltage battery, said vehicle comprising a monitoring device adapted to control the electric machine and the heat machine, wherein said system comprises:

means for managing energy of the power unit and adapted to supply data indicating an estimate of a drive torque, an estimate of a generating torque, and Boolean data indicating an authorization to stop or to request a start-up of the heat machine;

means for managing the duty battery, adapted to receive, by input, data indicating a temperature of said battery and adapted to supply by output to the means for managing the energy of the power unit data indicating a set value for a charge voltage of said battery; and means for managing the power battery, adapted to receive, by input, data indicating temperatures, a charging current and voltages of said battery, and adapted to supply by output, to the means for managing the energy of the power unit, data indicating a type of charge of said battery to be produced.

2. System according to claim 1, wherein the means for managing the power battery comprise means for determining a state of charge of the power battery, means for monitoring the power battery and means for deciding a type of charge to be produced, adapted to receive by input data, possibly Boolean, coming from said determining means and monitoring means.

3. System according to claim 2, wherein the monitoring means are adapted to transmit a request for starting up a cooling fan as a function of the measured temperature of the power battery.

4. System according to any one of claim 2 or 3, wherein the decision-making means are adapted to receive, by input, data, possibly Boolean, on the state of charge of the power battery coming from the means, and data on alerts sent by the monitoring means, thus determining, depending on the different activated alerts, the cut-off of the charge or discharge of the power battery.

5. System according to claim 4, characterized in that the decision-making means are adapted, as a function of the data, possibly Boolean, on the state of charge, to perform the following strategy:

if SOC<SOC_P then there is priority charge, corresponding to recharging the battery as a priority so that the state of charge leaves the forbidden zone without taking into account the output of the drive chain;

if SOC_P≦SOC<SOC_N then there is normal charge, corresponding to recharging the battery if certain conditions are fulfilled, for example, heat engine not stopped, good output of the drive chain; and if SOC≧SOC_N then there is no charge, SOC_P and SOC_N being variables that are determined as follows:

no request for charge while stopped then SOC_P=50% and SOC_N=95%; and a request for charge while stopped then SOC_P=80% and SOC_N=80%.

* * * * *